(12) United States Patent
Wu et al.

(10) Patent No.: US 11,281,784 B2
(45) Date of Patent: *Mar. 22, 2022

(54) DATA PROCESSING METHOD AND DEVICE

(71) Applicant: ADVANCED NEW TECHNOLOGIES CO., LTD., Grand Cayman (KY)

(72) Inventors: Yuncheng Wu, Hangzhou (CN); Wenxiang Wang, Hangzhou (CN); Le Zhang, Hangzhou (CN); Li Lin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,766

(22) Filed: Jul. 13, 2021

(65) Prior Publication Data

US 2021/0342457 A1 Nov. 4, 2021

Related U.S. Application Data

(63) Continuation of application No. 17/075,067, filed on Oct. 20, 2020, now Pat. No. 11,074,352, which is a
(Continued)

(30) Foreign Application Priority Data

Apr. 18, 2019 (CN) .......................... 201910313023.0

(51) Int. Cl.
*G06F 21/60* (2013.01)
*G06N 20/00* (2019.01)

(52) U.S. Cl.
CPC .......... *G06F 21/602* (2013.01); *G06F 21/606* (2013.01); *G06N 20/00* (2019.01); *G06F 2221/2149* (2013.01)

(58) Field of Classification Search
CPC ................ G06F 21/602; G06F 21/606; G06F 2221/2149; G06N 20/00
See application file for complete search history.

(56) References Cited

U.S. PATENT DOCUMENTS 6,757,710 B2 6/2004 Reed
7,734,663 B2 6/2010 DeAnna et al.
(Continued)

FOREIGN PATENT DOCUMENTS

CN 101727545 A 6/2010
CN 102223407 B 12/2014
(Continued)

OTHER PUBLICATIONS

First Search dated May 7, 2020, issued in related Chinese Application No. 201910313023.0 (2 pages).
(Continued)

*Primary Examiner* — Mohammad W Reza

(57) ABSTRACT

A method, implementable by a data processing server comprising a trusted execution environment, includes: obtaining a ciphertext of target data from an external system; obtaining one or more parameters of a model for processing the target data; obtaining, via a data transmission channel between the trusted execution environment and the external system, an encryption key associated with the ciphertext of the target data; inputting the ciphertext of the target data and the one or more parameters of the model to the trusted execution environment; decrypting, in the trusted execution environment, the ciphertext using the encryption key to obtain the target data; processing, in the trusted execution environment, the obtained target data using the model with the one or more parameters to obtain a result; encrypting, in the
(Continued)

trusted execution environment, the result using the encryption key; and sending the encrypted result to the external system.

20 Claims, 6 Drawing Sheets

Related U.S. Application Data continuation of application No. 16/853,419, filed on Apr. 20, 2020, now Pat. No. 10,846,413, which is a continuation of application No. PCT/CN2020/072061, filed on Jan. 14, 2020.

(56) References Cited

U.S. PATENT DOCUMENTS

| | | | |
|---|---|---|---|
| 7,805,377 | B2 | 9/2010 | Felsher |
| 7,962,750 | B1 | 6/2011 | Gruse et al. |
| 8,001,377 | B2 | 8/2011 | Suzuoki et al. |
| 8,458,494 | B1 | 6/2013 | Bogorad |
| 8,607,358 | B1 | 12/2013 | Shankar et al. |
| 8,694,771 | B2 | 4/2014 | Malek |
| 8,948,200 | B2 | 2/2015 | Alt et al. |
| 9,141,769 | B1 | 9/2015 | Hitchcock et al. |
| 9,397,832 | B2 | 7/2016 | Androulaki et al. |
| 9,419,951 | B1 | 8/2016 | Felsher et al. |
| 10,630,468 | B1 * | 4/2020 | Wang ............ H04L 9/085 |
| 2011/0321139 | A1 | 12/2011 | Jayaraman et al. |
| 2014/0281511 | A1 | 9/2014 | Kaushik et al. |
| 2014/0359305 | A1 | 12/2014 | Pappachan et al. |
| 2018/0011867 | A1 | 1/2018 | Bowman et al. |
| 2018/0247083 | A1 | 8/2018 | Rizzo et al. |
| 2018/0375638 | A1 | 12/2018 | Khanna |
| 2019/0042937 | A1 | 2/2019 | Sheller et al. |
| 2019/0287026 | A1 | 9/2019 | Calmon et al. |

FOREIGN PATENT DOCUMENTS

| | | |
|---|---|---|
| CN | 104641592 B | 5/2015 |
| CN | 105301639 B | 2/2016 |
| CN | 104885092 B | 11/2017 |
| CN | 108805160 A | 11/2018 |
| CN | 109284313 A | 1/2019 |
| CN | 109308418 A | 2/2019 |
| CN | 109309652 A | 2/2019 |
| CN | 109426732 A | 3/2019 |
| CN | 110162981 A | 8/2019 |
| JP | 4113865 B2 | 7/2008 |

OTHER PUBLICATIONS

First Office Action dated May 12, 2020, issued in related Chinese Application No. 201910313023.0, with English machine translation (16 pages).
Supplementary Search for Chinese Application No. 201910313023.0 dated Jul. 7, 2020.
Supplementary Search for Chinese Application No. 201910313023.0 dated Aug. 4, 2020.
Second Office Action dated Jul. 15, 2020, issued in related Chinese Application No. 201910313023.0, with English machine translation (13 pages).
Supplementary Search for Chinese Application No. 201910313023.0 dated Aug. 26, 2020 (1 page).
Non-Final Office Action dated Jun. 1, 2020, issued in related U.S. Appl. No. 16/853,419 (10 pages).
Written Opinion and International Search Reporton PCT Application No. PCT/CN2020/072061 dated Oct. 22, 2020.

* cited by examiner

DATA PROCESSING METHOD AND DEVICE

CROSS-REFERENCE TO RELATED APPLICATIONS

The present application is a continuation application of U.S. patent application Ser. No. 17/075,067, filed on Oct. 20, 2020, and entitled "DATA PROCESSING METHOD AND DEVICE", which is a continuation application of U.S. patent application Ser. No. 16/853,419, filed on Apr. 20, 2020, and entitled "DATA PROCESSING METHOD AND DEVICE", issued as U.S. Pat. No. 10,846,413 on Nov. 24, 2020, which is a continuation application of International Patent Application No. PCT/CN2020/072061, filed on Jan. 14, 2020, and entitled "DATA PROCESSING METHOD AND DEVICE," which claims priority to the Chinese Patent Application No. 201910313023.0, filed on Apr. 18, 2019. All of the above-referenced applications are incorporated herein by reference in their entirety.

TECHNICAL FIELD

The application relates to the technical field of data processing, and in particular, to a data processing method and apparatus.

BACKGROUND

In the big data era, various useful information can be obtained by mining, analyzing, and processing data; and thus, the importance of data is self-evident. Each entity may have its own data. In some situations, an entity may upload the data owned thereby to a third party platform for data analysis to process and mine the data.

However, when using a third party platform to analyze data, the data owner may be concerned about a potential leak of the data. Furthermore, it may not comply with data transmission regulations to directly transmit data to a third party platform for data analysis.

Therefore, how to prevent a data owner's data from leaking, improve data security, and comply with the data transmission regulations are urgent technical issues to be addressed.

SUMMARY

The embodiments of the specification provide a data processing method and system. When an external system (e.g., a data provider) processes data via a data processing server, the data provider encrypts the data and upload the encrypted data (also referred to as ciphertext of the data) to the data processing server; in this way, a transmission between the data provider and the data processing server complies with data transmission regulations. In addition, after the data processing server obtains the ciphertext of the data uploaded by the data provider, the ciphertext is processed and analyzed in a trusted execution environment on the data processing server; and the trusted execution environment outputs a data processing result. Therefore, plaintext of to-be-processed data (alternatively referred to as target data) provided by the data provider can be obtained from nowhere but the trusted execution environment, thereby guaranteeing data security of the data provider.

According to one aspect of the specification, a data processing method is provided. The method is implementable by a data processing server comprising a trusted execution environment, and the method may include: obtaining a ciphertext of target data from an external system; obtaining one or more parameters of a model for processing the target data; obtaining, via a data transmission channel between the trusted execution environment and the external system, an encryption key associated with the ciphertext of the target data; inputting the ciphertext of the target data and the one or more parameters of the model to the trusted execution environment; decrypting, in the trusted execution environment, the ciphertext using the encryption key to obtain the target data; processing, in the trusted execution environment, the obtained target data using the model with the one or more parameters to obtain a result; encrypting, in the trusted execution environment, the result using the encryption key; and sending the encrypted result to the external system.

In some embodiments, obtaining one or more parameters of a model for processing the target data may include: determining the one or more parameters of the model by training the model via an iterative process; or obtaining the one or more parameters of the model from one or more data stores associated with the data processing server.

In some embodiments, determining the one or more parameters of the model by training the model via an iterative process may include: obtaining a ciphertext of sample data from the external system; decrypting, in the trusted execution environment, the ciphertext of the sample data to obtain the sample data; and determining, in the trusted execution environment, the one or more parameters by training the model based on the sample data.

In some embodiments, determining the one or more parameters of the model by training the model via an iterative process may include: obtaining from the external system one or more initialization parameter values for the one or more parameters of the model; and updating the one or more initialization parameter values via the iterative process to obtain the one or more parameters of the model.

In some embodiments, determining the one or more parameters of the model by training the model via an iterative process may include: encapsulating the ciphertext of the sample data into a plurality of ciphertext packets, wherein each of the plurality of ciphertext packets comprises a portion of the ciphertext of sample data; and training the model based on one of the plurality of ciphertext packets in each iteration of the iterative process.

In some embodiments, encapsulating the ciphertext of the sample data into a plurality of ciphertext packets may include: determining, by a master node in the trusted execution environment, a quantity of pieces of the ciphertext of the sample data in each of the plurality of ciphertext packets; obtaining, by a plurality of data obtaining nodes in the trusted execution environment, the determined quantity of pieces of the ciphertext of the sample data from the plurality of ciphertext of the sample data; collecting, by the master node, the determined quantity of pieces of ciphertext of sample data from each of the plurality of data obtaining nodes; and inputting, by the master node, the collected ciphertext of the sample data to the trusted execution environment.

In some embodiment, inputting the ciphertext of the target data and the one or more parameters of the model to a trusted execution environment may include: inputting the ciphertext of the target data and the one or more parameters of the model in a serialized form to the trusted execution environment by calling a Java Native Interface (JNI) function.

A system for data processing may include: one or more processors including a trusted execution environment and one or more non-transitory computer-readable memories coupled to the one or more processors and configured with instructions executable by the one or more processors to cause the apparatus to perform operations including: obtaining a ciphertext of target data from an external system; obtaining one or more parameters of a model for processing the target data; obtaining, via a data transmission channel between the trusted execution environment and the external system, an encryption key associated with the ciphertext of the target data; inputting the ciphertext of the target data and the one or more parameters of the model to the trusted execution environment; decrypting, in the trusted execution environment, the ciphertext using the encryption key to obtain the target data; processing, in the trusted execution environment, the obtained target data using the model with the one or more parameters to obtain a result; encrypting, in the trusted execution environment, the result using the encryption key; and sending the encrypted result to the external system.

A non-transitory computer-readable storage medium configured with instructions executable by one or more processors including a trusted execution environment, to cause the one or more processors to perform operations including: obtaining a ciphertext of target data from an external system; obtaining one or more parameters of a model for processing the target data; obtaining, via a data transmission channel between the trusted execution environment and the external system, an encryption key associated with the ciphertext of the target data; inputting the ciphertext of the target data and the one or more parameters of the model to the trusted execution environment; decrypting, in the trusted execution environment, the ciphertext using the encryption key to obtain the target data; processing, in the trusted execution environment, the obtained target data using the model with the one or more parameters to obtain a result; encrypting, in the trusted execution environment, the result using the encryption key; and sending the encrypted result to the external system.

In the embodiments of the specification, when a data provider processes data via a data processing server, the data provider encrypts the data and upload the encrypted data (also referred to as ciphertext of the data) to the data processing server. In this way, a transmission between the data provider and the data processing server complies with data transmission regulations.

In addition, after the data processing server obtains the ciphertext of the data uploaded by the data provider, the ciphertext is processed and analyzed in a trusted execution environment on the data processing server; and the trusted execution environment outputs a data processing result. Therefore, plaintext of to-be-processed data provided by the data provider can be obtained from nowhere but the trusted execution environment, thereby guaranteeing data security of the data provider.

BRIEF DESCRIPTION OF THE DRAWINGS

To describe the embodiments of the specification, the accompanying drawings to be used in describing the embodiments will be briefly described hereafter. The accompanying drawings described below only depict some embodiments of the specification. Those skilled in the art can obtain other drawings according to the accompanying drawings without a creative effort.

DETAILED DESCRIPTION

To enable those skilled in the art to better understand the embodiments of the specification, the embodiments of the specification will be described in detail hereafter in combination with the accompanying drawings depicting the embodiments of the specification. The described embodiments are merely some, but not all, embodiments of the specification. Based on the embodiments of the specification, all the other embodiments obtained by those skilled in the art without a creative effort should all fall within the protection scope of the application.

The concept of the embodiments of the specification lies in that a data provider (or a user) encrypts data to-be uploaded to a data processing server, and the decryption and processing of the encrypted data uploaded by the user are implemented in a trusted execution environment set on the data processing server, such that plaintext of the data can only be obtained from the trusted execution environment, but not from a non-trusted execution environment on the data processing server or anywhere else, thereby guaranteeing data security of the data provider. Based on this concept, the embodiments of the specification provide a data processing method, apparatus, device, and storage medium, which will be described in detail respectively in what follows.

In some embodiments, the above-described data processing server may be a third party data processing platform; and the above-described trusted execution environment can be a trusted space or a secure area created on the data processing server through some technologies, for example, under an instruction of Intel Software Guard Extensions (SGX). The SGX is a trusted computing processor technology; therefore, security of the data uploaded by the data provider is guaranteed by the trusted space. In other examples, other trusted computing processor technologies may be used to create the trusted space on the data processing server.

In some embodiments, a method for data processing is applicable on a data processing server, which is a third party data processing platform. For example, The executive body of the method may be a data processing apparatus installed on the data processing server.

Figure 1:
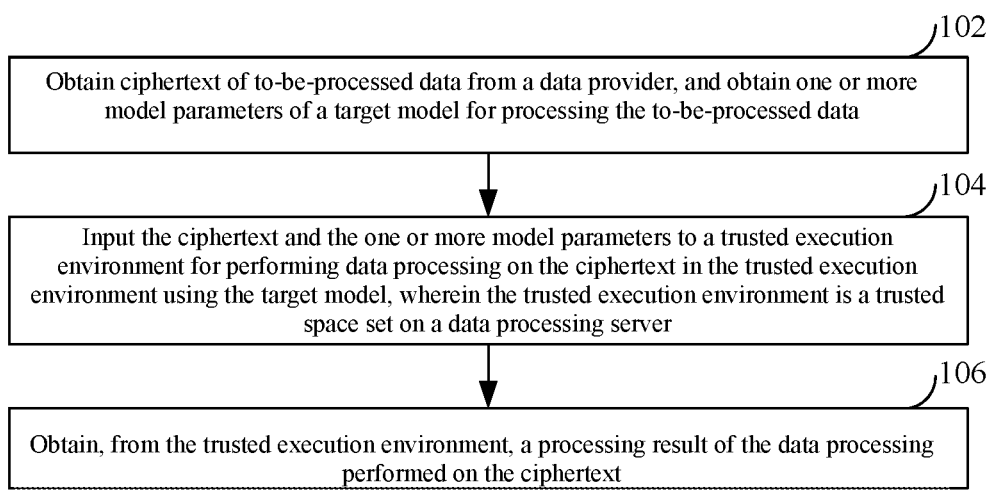
FIG. 1 shows a flow chart of a data processing method according to some embodiments of the specification.

FIG. 1 shows a flow chart of a data processing method according to some embodiments of the specification. As shown in FIG. 1, the method may include at least the following steps.

At Step 102, the method may include obtaining ciphertext of to-be-processed data from a data provider, and obtaining one or more model parameters of a target model for processing the to-be-processed data.

In the embodiments of the specification, the data provider is an external system to a server for data processing. To ensure security of data provided by the data provider, before uploading the to-be-processed data (alternatively referred to as target data), the data provider can encrypt the to-be-processed data and upload the encrypted to-be-processed data (also referred to as ciphertext of the to-be-processed data) to the data processing server. In some embodiments, the data provider may upload the ciphertext via a terminal device to the data processing server for data processing.

After the data processing server receives the ciphertext uploaded by the data provider, one or more model parameters of the target model for processing the to-be-processed data may be obtained. For example, the target model can be a model in a distributed computing framework, such as, a Gaussian mixture model (GMM). The type of model in the distributed computing framework can be determined to be the target model according to practical requirements for processing the to-be-processed data.

For example, if the data provider instructs that a training of the target model is not required, the model parameters of the target model may be obtained from the data processing server; otherwise, the target model may be trained. A training process of the target model may include training various model parameters of the target model.

At Step 104, the method may include inputting the ciphertext of the to-be-processed data and the one or more model parameters to a trusted execution environment for performing data processing on the ciphertext in the trusted execution environment using the target model, wherein the trusted execution environment is a trusted space set on the data processing server.

In some embodiments, when the ciphertext of the to-be-processed data transmitted by the data provider is received, a trusted execution environment corresponding to the data provider may be created on the data processing server; and the ciphertext and the one or more model parameters of the target model are inputted into the trusted execution environment, such that the ciphertext of the to-be-processed data is decrypted in the trusted execution environment, and the obtained to-be-processed data after decryption is processed by using the target model with the one or more model parameters.

In this way, the decryption of the ciphertext of the to-be-processed data provided by the data provider is executed in the trusted execution environment, such that plaintext of the to-be-processed data from the data provider can be obtained from the trusted execution environment rather than a non-trusted execution environment; and data security can be guaranteed by the trusted execution environment for the data provider, thereby improving the data security for the data provider.

In addition, in the embodiments of the specification, the process of processing the to-be-processed data may be set based on the requirements of the data provider. For example, if the data provider is to perform a cluster analysis on the to-be-processed data, a data cluster model may be determined as the target model, which is used in the trusted execution environment to perform a cluster analysis on the to-be-processed data provided by the data provider; therefore, the data processing result outputted from the trusted execution environment is a data cluster result.

In some embodiments, since the data provider encrypts the to-be-processed data when uploading data, the ciphertext of the to-be-processed data is transmitted to the trusted execution environment. To facilitate the decryption of the ciphertext in the trusted execution environment, a secure channel may be disposed between the trusted execution environment and the data provider; and a data processing apparatus in the trusted execution environment can obtain a password for encrypting the data from the data provider via the secure channel, so as to decrypt and process the ciphertext.

At Step 106, the method may include obtaining, from the trusted execution environment, a processing result of the data processing performed on the ciphertext.

For example, after the data provided by the data provider is processed in the trusted execution environment, a corresponding processing result is outputted. In this way, except for the trusted execution environment, neither the plaintext of the data provided by the data provider nor the decryption password corresponding to the data uploaded by the data provider can be obtained from a non-trusted execution environment on the data processing server, such that the data provided by the data provider is not accessible from any non-trusted execution environment on the data processing server, thereby guaranteeing the security of the data provided by the data provider.

After the ciphertext is processed in the trusted execution environment, a processing result can be outputted. In addition, to further strengthen the security of the data uploaded by the data provider, the processing result can also be encrypted before being outputted. Therefore, at Step 106, the processing result obtained from the trusted execution environment can be plaintext, and can also be a processing result encrypted with a designated key. The designated key may be a key used by the data provider to encrypt the to-be-processed data.

Before the ciphertext corresponding to the to-be-processed data is processed by using the target model in the trusted execution environment, the ciphertext may be decrypted first. The key for encrypting the ciphertext of the to-be-processed data may be obtained via a secure channel between the trusted execution environment and the data provider. In the trusted execution environment, if the processing result of the to-be-processed data is encrypted, the key can be used to encrypt the processing result.

In the embodiments of the specification, the data uploaded by the data provider and obtained by the data processing server is the encrypted ciphertext of the to-be-processed data; the processing result of the to-be-processed data obtained by the data processing server from the trusted execution environment is also encrypted ciphertext. The encryption key is not transmitted via the non-trusted execution environment on the data processing server. Therefore, any data relevant to the data provider is not accessible from a non-trusted execution environment on the data processing server, thereby guaranteeing the data security for the data provider.

Figure 2:
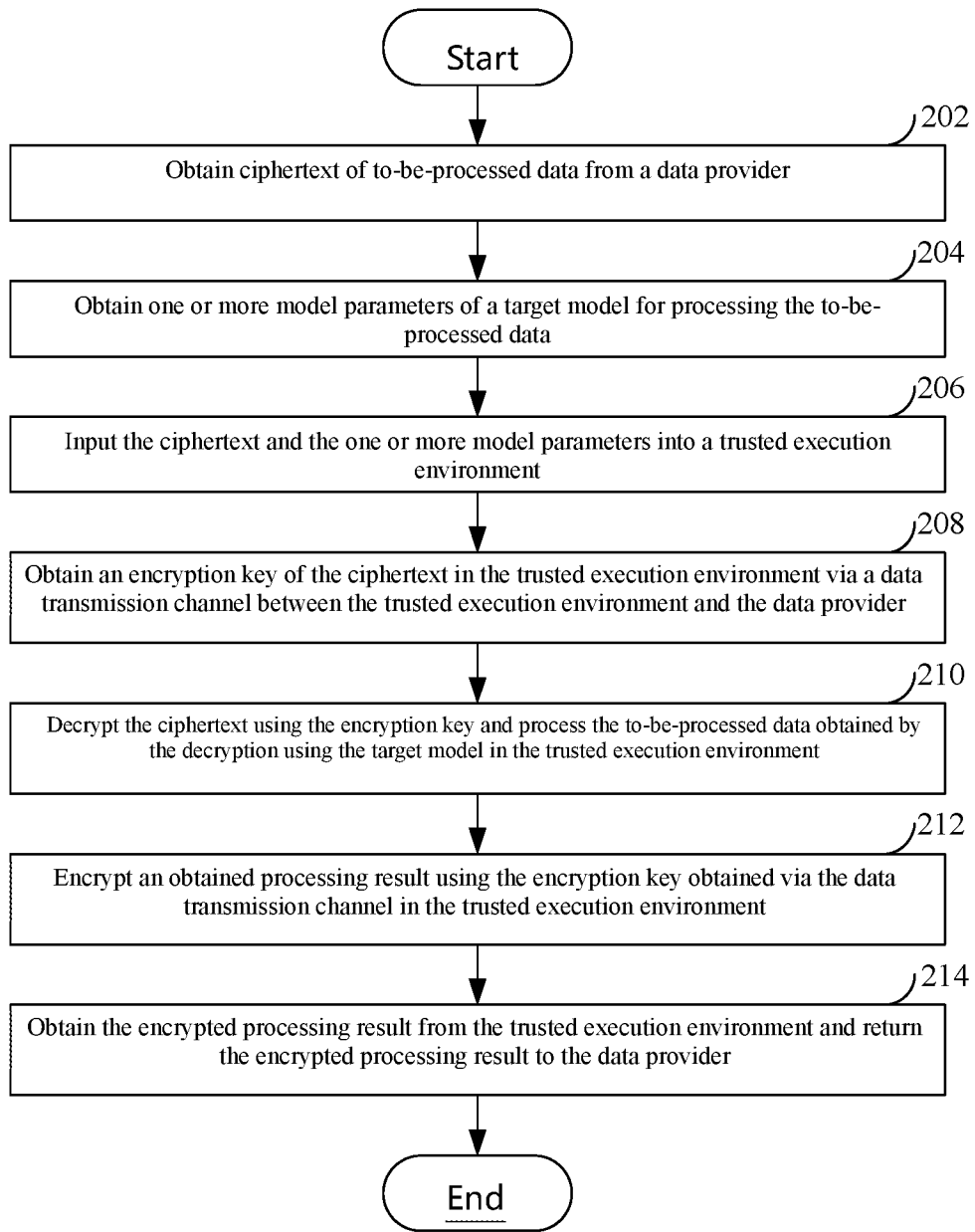
FIG. 2 shows another flow chart of a data processing method according to some embodiments of the specification.

FIG. 2 shows another flow chart of a data processing method according to some embodiments of the specification. As shown in FIG. 2, the method may include at least the following steps: Step 202, obtaining ciphertext of to-be-processed data from a data provider; Step 203, obtaining one or more model parameters of a target model for processing the to-be-processed data; Step 206, inputting the ciphertext and the one or more model parameters into a trusted execution environment; Step 208, obtaining an encryption key of the ciphertext in the trusted execution environment via a data transmission channel between the trusted execution environment and the data provider; Step 210, decrypting the ciphertext using the encryption key and processing the to-be-processed data obtained by the decryption using the target model in the trusted execution environment; Step 212, encrypting an obtained processing result using the encryption key obtained via the data transmission channel in the trusted execution environment; and Step 214, obtaining the encrypted processing result from the trusted execution environment and returning the encrypted processing result to the data provider.

In other embodiments, the data provider can also use an asymmetrical key to encrypt the to-be-processed data; to facilitate the decryption of the ciphertext and the encryption of the processing result in the trusted environment, a corresponding key pair can be obtained via the data transmission channel.

In some embodiments, the data transmission channel mentioned in the step 208 is a secure channel established between the trusted execution environment and the data provider. For example, the data transmission channel is a secure channel established between the trusted execution environment and a client that the data provider uses.

In the embodiments of the specification, at Step 102, obtaining one or more model parameters of a target model for processing the to-be-processed data may include: detecting whether the data provider instructs to train the target model; if so, then training the one or more model parameters of the target model; and if not, then obtaining the one or more model parameters of the target model stored on the data processing server. For example, the data processing server may be associated with one or more data stores for storing the model parameters of the target model or other data. The one or more model parameters of the target model may be obtained from the one or more data stores associated with the data processing server.

In some embodiments, detecting whether the data provider instructs to train the target model may include: detecting whether the data provider uploads ciphertext for training the target model; if so, then determining that the data provider instructs to train the target model; and if not, then determining that the data provider does not instruct to train the target model.

When the target model is to be trained, a large amount of sample data may be required; and such sample data may be provided by the data provider. For example, the data provider may indicate which data is the to-be-processed data and which data is used for model training (also referred to as sample data) when uploading the data. In some embodiments, if the data provider does not upload ciphertext of the sample data for model training, it can be determined that the data provider does not instruct to train the target model; thus, an existing corresponding data processing model on the data processing server may be used to process the to-be-processed data. If the ciphertext uploaded by the data provider includes the sample data for model training, it can be determined that the data provider instructs to train the target model, and the ciphertext of the sample data uploaded by the data provider can be used to train the model.

Figure 3:
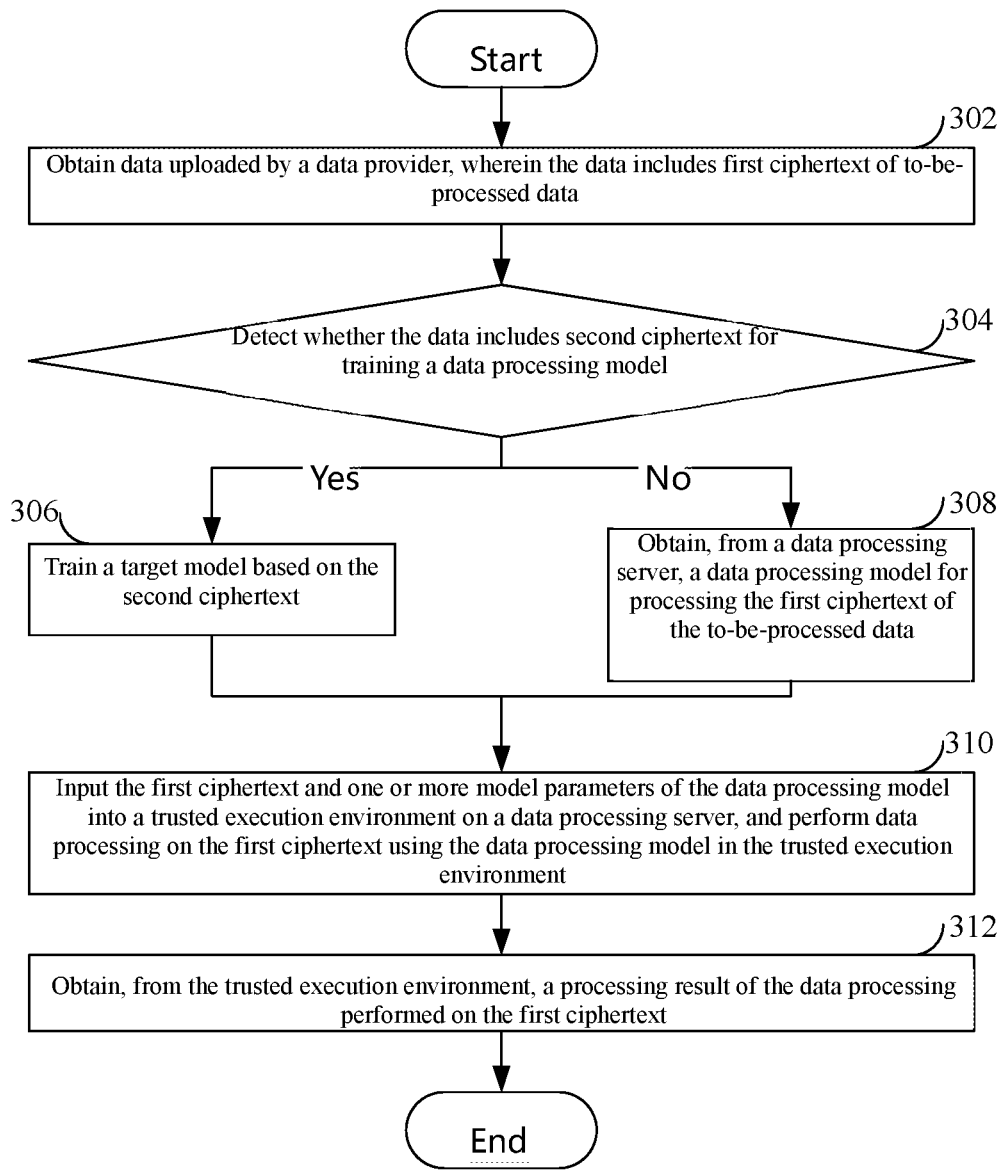
FIG. 3 shows still another flow chart of a data processing method according to some embodiments of the specification.

FIG. 3 shows still another flow chart of a data processing method according to some embodiments of the specification. As shown in FIG. 3, the method may include at least the following steps: Step 302, obtaining data uploaded by a data provider, wherein the data includes first ciphertext of to-be-processed data; Step 304, detecting whether the data includes second ciphertext for training a data processing model; if so, then executing step 306; and if not, then executing step 308; Step 306, training a target model based on the second ciphertext; Step 308, obtaining, from a data processing server, a data processing model for processing the first ciphertext of the to-be-processed data; Step 310, inputting the first ciphertext and one or more model parameters of the data processing model into a trusted execution environment on the data processing server, and performing data processing on the first ciphertext using the data processing model to in the trusted execution environment; Step 312, obtaining, from the trusted execution environment, a processing result of the data processing performed on the first ciphertext.

For example, if the target model is to be trained, the target model can be trained in the following steps. A training process of the target model may include training the model parameters of the target model. In some embodiments, training the model parameters of the target model may include: detecting whether the data provider uploads initialization parameter values corresponding to the target model; if so, then obtaining the initialization parameter values; and if not, then obtaining sample data from the second ciphertext used for training the target model and uploaded by the data provider, and determining the initialization parameter values in the trusted execution environment based on the sample data; and training the model parameters of the target model in the trusted execution environment based on the initialization parameter values and the second ciphertext.

In some embodiments, the initialization parameter values can refer to initialization values of the model parameters of the target model. For example, if the target model is a GMM model, then the initialization parameter values of the target model may include a weight, a mean vector, and a covariance matrix of the GMM model.

If a user such as a data provider does not upload the initialization parameter values of the target model, sample data may be obtained from the second ciphertext uploaded by the user; initialization parameter values of the target model may be determined based on the sample data; and then, the target model is trained based on the initialization parameter values and the second ciphertext.

In the embodiments of the specification, to guarantee the security of the data uploaded by the data provider, the training of the model parameters of the target model and the obtaining of the sample data may both be executed in the trusted execution environment on the data processing server.

For ease of understanding, the situation that the target model is a GMM model is taken as an example for illustration hereafter. When the model parameters (e.g., the weight, the mean vector and the covariance matrix) of the GMM model are trained, an iterative processing including multiple iterations may be performed for training the model parameters, until values of parameters satisfying a preset evaluation index requirement is obtained. An iteration may refer to one time of repetition of a set of operations for updating the parameters of a model (such as a machine learning model). The number of iterations in the iterative process indicates the number of times the model's parameters are updated.

In some embodiments, if the target model is a GMM model, the preset evaluation index can be a Log value of a likelihood function; and when the difference between the Log values of the likelihood function in two consecutive iterations is less than a preset threshold value, the currently obtained GMM model is deemed to be stable; and the iterations can stop.

If the trained target model is any other model, such as a linear regression model and a logistic regression model, the preset evaluation index can be a mean square error, a cross entropy, and so on. When the difference between the mean square errors or the cross entropies in two consecutive iterations is less than a preset threshold value, the iterative process can stop. The preset evaluation index requirements corresponding to the above-mentioned models are examples only, but are not intended to limit the embodiments of the specification; and the evaluation index requirements can be set according to practical requirements.

For example, after the initialization parameter values of the GMM model are obtained, the initialization parameter values and the second ciphertext are transmitted to the trusted execution environment. An iterative processing including multiple iterations may be performed for the initialization parameter values in the trusted execution environment based on the second ciphertext, so as to obtain parameter values after multiple iterations; the parameter values are transmitted to a non-trusted execution environment on the data processing server. Whether the currently obtained parameter values satisfy the preset evaluation index requirement is inspected in the non-trusted execution environment of the data processing server: if the parameter values satisfy the preset evaluation index requirement, the parameter values are determined to be the trained parameter values of the GMM model; otherwise, the parameter values are transmitted to the trusted execution environment to perform next iteration until parameter values satisfying the preset evaluation index requirement are obtained, which means the training of the GMM model is completed.

Figure 4:
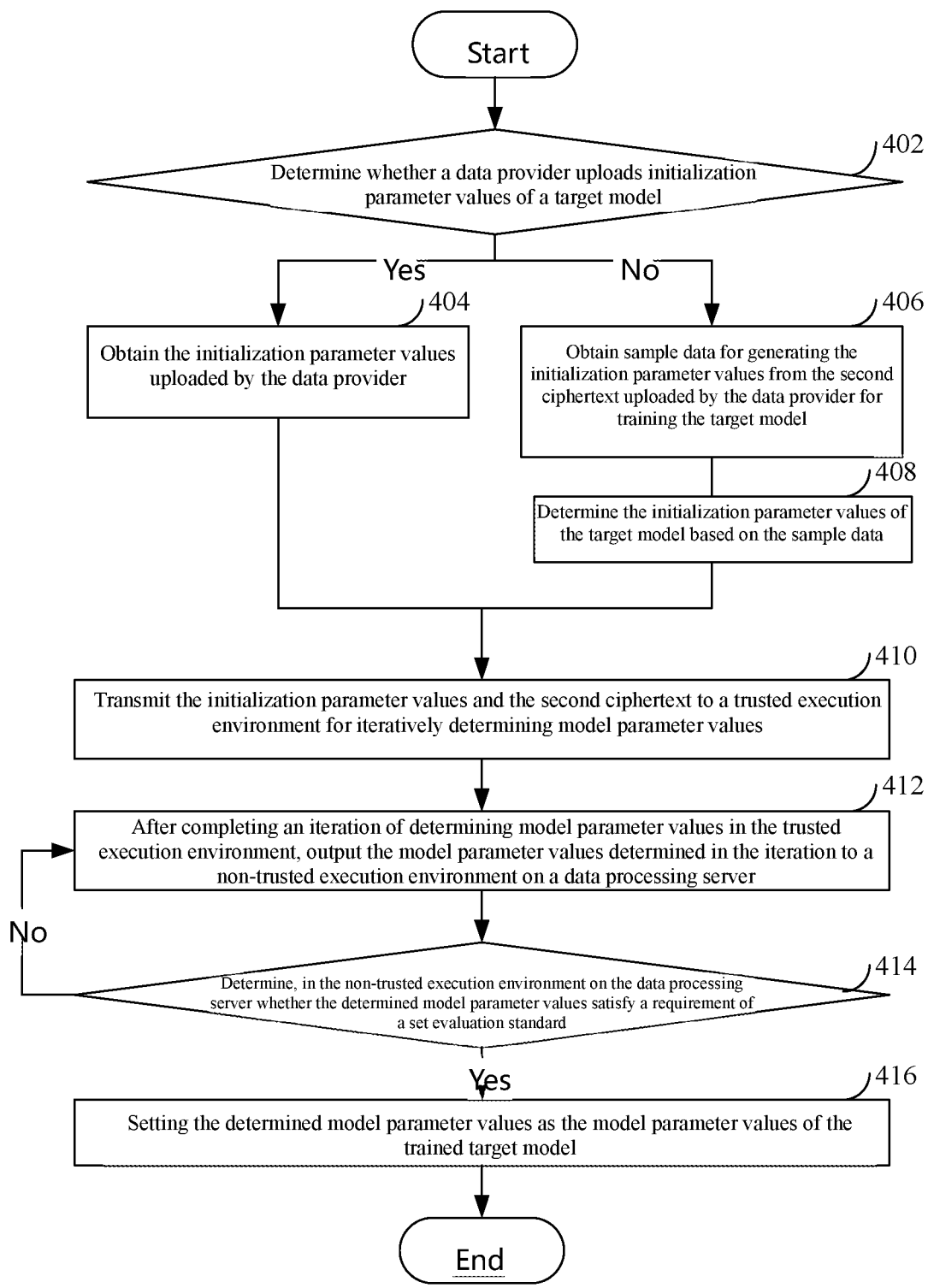
FIG. 4 shows a flow chart of a method for training a target model in a data processing method according to some embodiments of the specification.

FIG. 4 shows a flow chart of a method for training a target model in a data processing method according to some embodiments of the specification. As shown in FIG. 4, the method may include at least the following steps: Step 402, determining whether a data provider uploads initialization parameter values of a target model; if so, then executing step 404; and if not, executing step 406; Step 404, obtaining the initialization parameter values uploaded by the data provider; Step 406, obtaining sample data for generating initialization parameter values from second ciphertext uploaded by the data provider for training the target model; Step 408, determining the initialization parameter values of the target model based on the sample data; Step 410, transmitting the initialization parameter values and the second ciphertext to a trusted execution environment for iteratively determining model parameter values; Step 412, after completing an iteration of determining model parameter values in the trusted execution environment, outputting the model parameter values determined in the iteration to a non-trusted execution environment on a data processing server; Step 414, determining in the non-trusted execution environment on the data processing server whether the determined model parameter values satisfy a requirement of a set evaluation standard; if so, then executing step 416; and if not, then executing the step 412; Step 416, setting the determined model parameter values as the model parameter values of the trained target model.

In addition, in some embodiments, when the parameters of the target model are being trained, the model parameter values determined in each iteration may be continuously outputted to the non-trusted execution environment on the data processing serve. In some embodiments, to prevent the original data provided by the data provider from being reversely deduced based on the model parameters in each iteration, if the data provider instructs to train the target model, the second ciphertext for training the model can be encapsulated into a ciphertext packet. Therefore, the method may further include: encapsulating the second ciphertext into one or more ciphertext packets in the trusted execution environment, wherein multiple pieces of the second ciphertext may be encapsulated in each of the one or more ciphertext packets.

After the second ciphertext is encapsulated into the one or more ciphertext packets, each ciphertext packet may include multiple pieces of data. In this way, during the iterative process for training the model parameters, the ciphertext packet can be used as a unit to train the model parameters. For example, each iteration for determining the model parameter values may be based on multiple pieces of data, such that the original data cannot be reversely deduced according to the model parameters.

For example, the data provider may upload 100 pieces of data to train a model; and the data provider can use a key to encrypt each of the 100 pieces of data respectively, so as to obtain 100 pieces of second ciphertext. The data processing server transmits the 100 pieces of second ciphertext to the trusted execution environment, and respectively decrypts the 100 pieces of second ciphertext in the trusted execution environment, so as to obtain 100 pieces of plaintext corresponding to the second ciphertext. The 100 pieces of plaintext are divided into 10 groups; and 10 pieces of plaintext in each group are encrypted with the same key, so as to obtain a corresponding ciphertext packet.

The quantity of pieces of the data, the quantity of pieces of the ciphertext encapsulated in each ciphertext packet, and the number of the total encapsulated ciphertext packets listed herein are all examples, and are not intended to limit the embodiments of the specification.

In some embodiments, obtaining sample data from second ciphertext uploaded by the data provider and used for training the target model may include the following steps: determining, via a master node, the quantity of pieces of the sample data to be obtained from each ciphertext packet; obtaining a corresponding quantity of pieces of the second ciphertext from each ciphertext packet in the trusted execution environment via multiple data obtaining nodes; and collecting, via the master node, the second ciphertext obtained by each data obtaining node, and inputting the obtained second ciphertext into the trusted execution environment so as to encapsulate the second ciphertext into ciphertext packets in the trusted execution environment as the sample data.

In some embodiments, the master node can be denoted as a "Master node;" and the Master node can determine the quantity of pieces of the sample data to be obtained from each ciphertext packet according to the number of the ciphertext packets corresponding to the second ciphertext and the quantity of pieces of required sample data, and assign a data obtaining task to each data obtaining node (Worker node). The Worker nodes perform data obtaining and input the ciphertext packets into the trusted execution environment, decrypt the ciphertext packets in the trusted execution environment to obtain the plaintext contained in the ciphertext packets, obtain a corresponding quantity of pieces of the plaintext from each ciphertext packet, and respectively encrypt the plaintext in the trusted execution environment. For example, the sample data obtained by each Worker node from each ciphertext packet is still the encrypted second ciphertext; the second ciphertext obtained by each Worker node is collected to the Master node; and the Master node inputs the second ciphertext into the trusted execution environment, and encapsulates the obtained second ciphertext into ciphertext packets in the trusted execution environment.

The number of the ciphertext packets into which the second ciphertext is encapsulated can be set according to practical requirements, and will not be defined in the embodiment of the specification.

In addition, in some embodiments, inputting the first ciphertext and the model parameters into a trusted execution environment may include: inputting the first ciphertext and the model parameters in a serialized form into the trusted execution environment by calling a Java Native Interface (JNI) function. In some embodiments, other data may also be transmitted to the trusted execution environment by calling a JNI function.

In some embodiments, if the data is transmitted to the trusted execution environment by calling a JIN function, a FlatBuffers format of the data to be transmitted to the trusted execution environment by calling a JIN function can be first defined. A FlatBuffers command is used to generate corresponding Java and C++ files; and a trusted execution environment (which can be called as Enclave) is created on a Scala layer. The data to be transmitted to the trusted execution environment is serialized using FlatBuffers on the Scala layer, and is transmitted to the trusted execution environment by calling a JNI function. After the data is transmitted to the trusted execution environment, the written data is deserialized using FlatBuffers in the trusted execution environment.

For example, when the data in the trusted execution environment is transmitted to a non-trusted execution environment on the data processing server, the to-be-transmitted data can be serialized using FlatBuffers, and is transmitted to the Scala layer. If the transmitted data is a ciphertext packet, the transmitted data can be used at the Scala layer; otherwise, the outputted data can be deserialized using FlatBuffers to obtain a Scala layer computable data structure.

Figure 5:
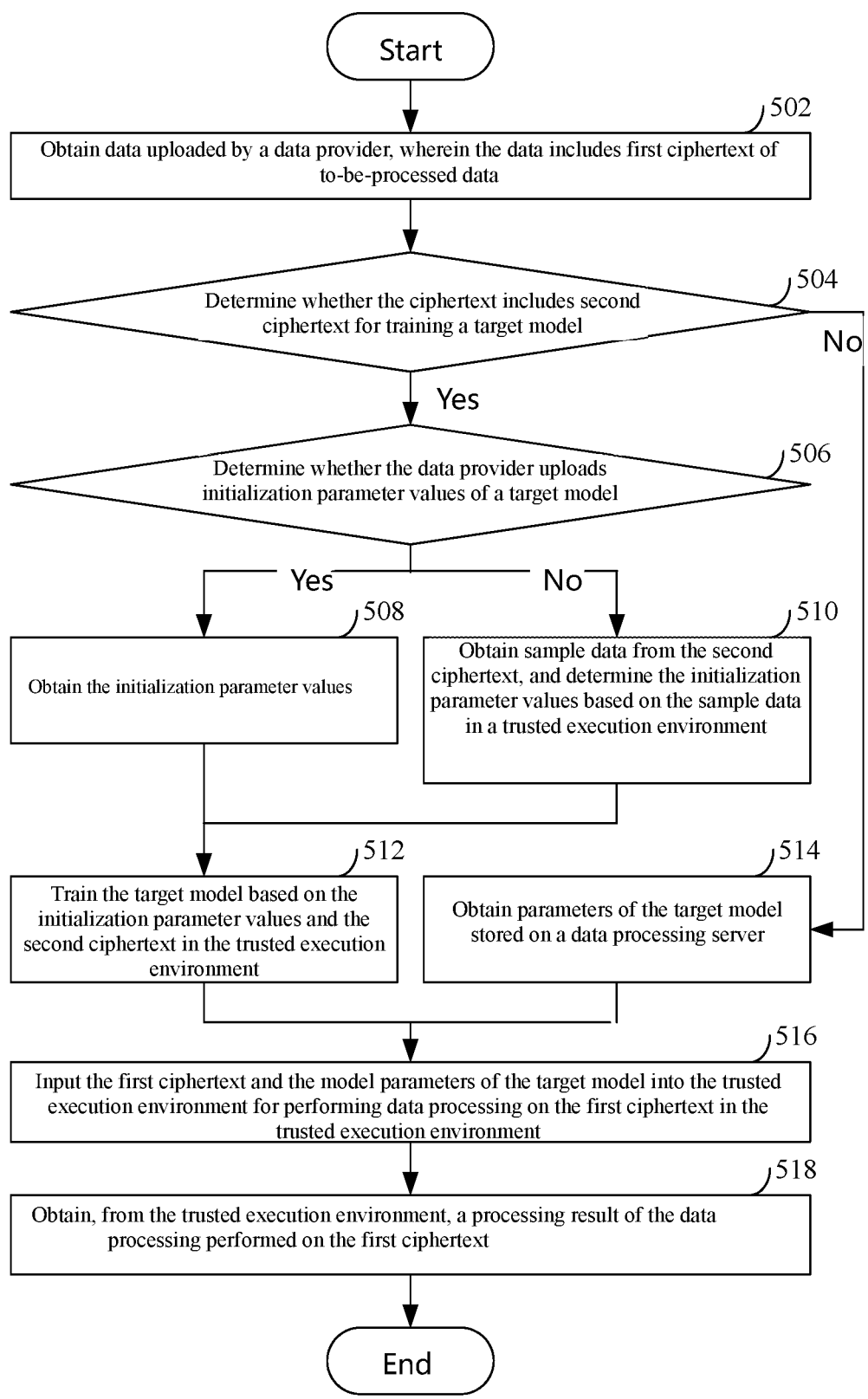
FIG. 5 shows yet another flow chart of a data processing method according to some embodiments of the specification.

FIG. 5 shows yet another flow chart of a data processing method according to some embodiments of the specification. As shown in FIG. 5, the method may include at least the following steps: Step 502, obtaining data uploaded by a data provider, wherein the data includes first ciphertext of to-be-processed data; Step 504, determining whether the data includes second ciphertext for training a target model; if so, then executing step 506; and if not, then executing step 514; Step 506, determining whether the data provider uploads initialization parameter values of a target model; if so, then executing step 508; and if not, then executing step 510; Step 508, obtaining the initialization parameter values; Step 510, obtaining sample data from the second ciphertext, and determining initialization parameter values based on the sample data in a trusted execution environment; Step 512, training the target model based on the initialization parameter values and the second ciphertext in the trusted execution environment; Step 514, obtaining parameters of the target model stored on a data processing server; Step 516, inputting the first ciphertext and the model parameters of the target model into the trusted execution environment for performing data processing on the first ciphertext in the trusted execution environment; Step 518, obtaining, from the trusted execution environment, a processing result of the data processing performed on the first ciphertext.

According to the data processing methods provided in the embodiments of the specification, when a data provider processes data via a data processing server, the data provider encrypts the to-be-processed data before uploading to the data processing server. In this way, the transmission between the data provider and the data processing server complies with the data transmission regulations. In addition, after the data processing server obtains ciphertext of the to-be-processed data uploaded by the data provider, the ciphertext is processed and analyzed in a trusted execution environment on the data processing server; and the trusted execution environment outputs a data processing result. Therefore, plaintext of to-be-processed data provided by the data provider can be obtained from nowhere but the trusted execution environment, thereby guaranteeing data security of the data provider.

Figure 6:
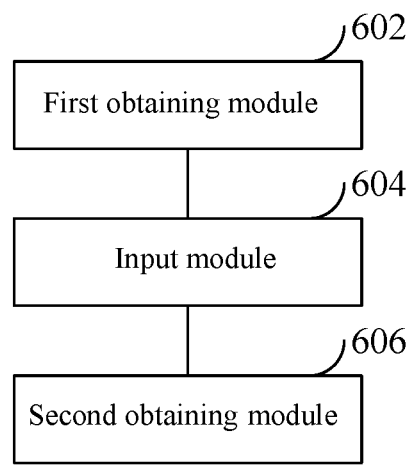
FIG. 6 shows a schematic diagram of modules forming a data processing apparatus according to some embodiments of the specification.

Similar to the data processing methods provided in the embodiments of the specification, and based on the same concept, a data processing apparatus applicable to a data processing server is provided according to some embodiments of the specification, where the apparatus is configured to execute the data processing methods provided in the embodiments of the specification. FIG. 6 is a schematic diagram of modules forming the data processing apparatus according to some embodiments of the specification. As shown in FIG. 6, the apparatus may include at least: a first obtaining module 602, configured to obtain first ciphertext of to-be-processed data provided by a data provider, and obtain one or more model parameters of a target model for processing the to-be-processed data; an input module 604, configured to input the first ciphertext and the one or more model parameters into a trusted execution environment to use the target model to perform data processing on the first ciphertext in the trusted execution environment, wherein the trusted execution environment is a trusted space set on the data processing server; and a second obtaining module 606, configured to obtain, from the trusted execution environment, a processing result of the data processing performed on the first ciphertext.

In some embodiments, the processing result obtained from the trusted execution environment is encrypted with a designated key; and the designated key is a key used by the data provider to encrypt the to-be-processed data.

In some embodiments, the first obtaining module 602 may include: a detection unit, configured to detect whether the data provider instructs to train the target model; a training unit, configured to train the one or more model parameters of the target model if the data provider instructs to train the target model; and an obtaining unit, configured to obtain the one or more model parameters of the target model stored on the data processing server if the data provider does not instruct to train the target model.

In some embodiments, the detection unit may include: a second detection sub-unit, configured to detect whether the data provider uploads second ciphertext for training the target model; a determination sub-unit, configured to determine that the data provider instructs to train the target model if the data provider uploads the second ciphertext for training the target model, and determine that the data provider does not instruct to train the target model if the data provider does not upload the second ciphertext for training the target model.

In some embodiments, the training unit may include: a first detection sub-unit, configured to detect whether the data provider uploads one or more initialization parameter values corresponding to the target model; a first obtaining sub-unit, configured to obtain the one or more initialization parameter values if the data provider uploads the one or more initialization parameter values; a first determination sub-unit, configured to obtain sample data from second ciphertext uploaded by the data provider and used for training the target model if the data provider does not upload one or more initialization parameter values, and determine one or more initialization parameter values in the trusted execution environment based on the sample data; and a training sub-unit, configured to train the one or more model parameters of the target model in the trusted execution environment based on the one or more initialization parameter values and the second ciphertext.

In some embodiments, if the data provider instructs to train the target model: the apparatus may further include an encapsulation module configured to encapsulate the second ciphertext into one or more ciphertext packets in the trusted execution environment, wherein multiple pieces of the second ciphertext are encapsulated in each ciphertext packet.

In some embodiments, the first determination sub-unit may be configured to: determine, via a master node, the quantity of pieces of the sample data to be obtained from each ciphertext packet; obtain a corresponding quantity of pieces of the second ciphertext from each ciphertext packet in the trusted execution environment via multiple data obtaining nodes; collect, via the master node, the second ciphertext obtained by each data obtaining node, input the obtained second ciphertext into the trusted execution environment, and encapsulate the ciphertext into one or more ciphertext packets in the trusted execution environment as the sample data.

In some embodiments, the input module 604 may be configured to input the first ciphertext and the one or more model parameters in a serialized format into the trusted execution environment by calling a JNI function.

The data processing apparatus in the embodiments of the specification can also execute the methods as shown in FIGS. 1-5, and can achieve the functions of the embodiments as depicted in FIGS. 1-5, which will not be elaborated herein.

According to the data processing apparatus provided in the embodiments of the specification, when a data provider processes data via a data processing server, the data provider encrypts the to-be-processed data before uploading to the data processing server. In this way, the transmission between the data provider and the data processing server complies with the data transmission regulations. In addition, after the data processing server obtains ciphertext of the to-be-processed data uploaded by the data provider, the ciphertext is processed and analyzed in a trusted execution environment on the data processing server; and the trusted execution environment outputs a data processing result. Therefore, plaintext of to-be-processed data provided by the data provider can be obtained from nowhere but the trusted execution environment, thereby guaranteeing data security of the data provider.

Figure 7:
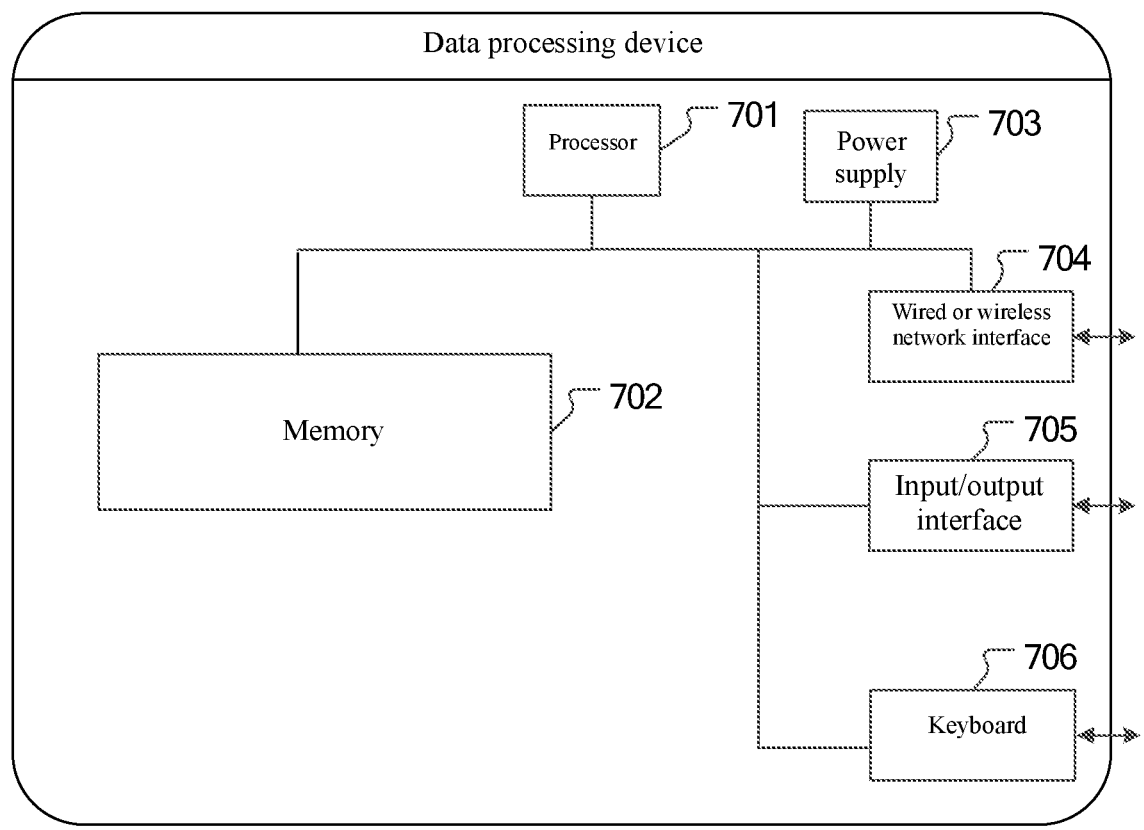
FIG. 7 shows a structural schematic diagram of a data processing device according to some embodiments of the specification.

Further, based on the methods as shown in FIGS. 1-5, the embodiments of the specification further provide a data processing device as shown in FIG. 7.

The data processing device may vary greatly because of different configurations or performances, and may include one or more processors 701 and a memory 702, where the memory 702 may store one or more application programs or data. In some embodiments, the memory 702 may be a volatile memory or a non-volatile memory. The one or more application programs stored in the memory 702 may include one or more modules (not shown in FIG. 7); and each module may include a series of computer-executable instructions executable by the data processing device. Further, the one or more processors 701 may be configured to communicate with the memory 702, and may execute the series of computer-executable instructions in the memory 702 on the data processing device. The data processing device may further include one or more power supplies 703, one or more wired or wireless network interfaces 704, one or more input/output interfaces 705, and one or more keyboards 706, etc.

In some embodiments, the data processing device may include a memory, and one or more programs, where the one or more programs are stored in the memory, and may include one or more modules. Each module may include a series of computer-executable instructions on the data processing device. The series of computer-executable instructions may be configured to be executed by one or more processors to perform the following operations: obtaining first ciphertext of to-be-processed data provided by a data provider, and obtaining one or more model parameters of a target model for processing the to-be-processed data; inputting the first ciphertext and the one or more model parameters into a trusted execution environment to use the target model to perform data processing on the first ciphertext in the trusted execution environment, wherein the trusted execution environment is a trusted space set on the data processing server; obtaining, from the trusted execution environment, a processing result of the data processing performed on the first ciphertext.

In some embodiments, when the computer-executable instruction is executed, the processing result obtained from the trusted execution environment is encrypted with a designated key; and the designated key is a key used by the data provider to encrypt the to-be-processed data.

In some embodiments, when the computer-executable instruction is executed, obtaining one or more model parameters of a target model for processing the to-be-processed data may include: detecting whether the data provider instructs to train the target model; and if so, then training the model parameter of the target model; if not, then obtaining the model parameter of the target model stored on the data processing server.

In some embodiments, when the computer-executable instruction is executed, detecting whether the data provider instructs to train the target model may include: detecting whether the data provider uploads second ciphertext for training the target model; and if so, then determining that the data provider instructs to train the target model; if not, then determining that the data provider does not instruct to train the target model.

In some embodiments, when the computer-executable instruction is executed, training the one or more model parameters of the target model may include: detecting whether the data provider uploads one or more initialization parameter values corresponding to the target model; if so, then obtaining the initialization parameter values; if not, then obtaining sample data from second ciphertext uploaded by the data provider and used for training the target model, and determining one or more initialization parameter values in the trusted execution environment based on the sample data; and training the one or more model parameters of the target model in the trusted execution environment based on the one or more initialization parameter values and the second ciphertext.

In some embodiments, when the computer-executable instruction is executed, if the data provider instructs to train the target model, the following operations may further be performed: encapsulating the second ciphertext into one or more ciphertext packets in the trusted execution environment, wherein multiple pieces of the second ciphertext are encapsulated in each ciphertext packet.

In some embodiments, when the computer-executable instruction is executed, obtaining sample data from second ciphertext uploaded by the data provider and used for training the target model may include: determining, via a master node, the quantity of pieces of the sample data to be obtained from each ciphertext packet; obtaining a corresponding quantity of pieces of the second ciphertext from each ciphertext packet in the trusted execution environment via multiple data obtaining nodes; collecting, via the master node, the second ciphertext obtained by each data obtaining node, inputting the obtained second ciphertext into the trusted execution environment, and encapsulating the ciphertext into one or more ciphertext packets in the trusted execution environment as the sample data.

In some embodiments, when the computer-executable instruction is executed, inputting the first ciphertext and the one or more model parameters into the trusted execution environment may include: inputting the first ciphertext and the one or more model parameters in a serialized format into the trusted execution environment by calling a JNI function.

According to the data processing device provided in the embodiments of the specification, when a data provider processes data via a data processing server, the data provider encrypts the to-be-processed data before uploading to the data processing server. In this way, the transmission between the data provider and the data processing server complies with the data transmission regulations. In addition, after the data processing server obtains ciphertext of the to-be-processed data uploaded by the data provider, the ciphertext is processed and analyzed in a trusted execution environment on the data processing server; and the trusted execution environment outputs a data processing result. Therefore, plaintext of to-be-processed data provided by the data provider can be obtained from nowhere but the trusted execution environment, thereby guaranteeing data security of the data provider.

Furthermore, based on the methods as shown in FIGS. 1-5, the embodiments of the specification further provide a storage medium configured to store computer-executable instructions. In some embodiments, the storage medium may be a USB flash disk, a compact disk, a hard disk, and the like; and when the computer-executable instructions stored on the storage medium are executed by a processor, the following steps are implemented: obtaining first ciphertext of to-be-processed data provided by a data provider, and obtaining one or more model parameters of a target model for processing the to-be-processed data; inputting the first ciphertext and the one or more model parameters into a trusted execution environment to use the target model to perform data processing on the first ciphertext in the trusted execution environment, wherein the trusted execution environment is a trusted space set on the data processing server; obtaining, from the trusted execution environment, a processing result of the data processing performed on the first ciphertext.

In some embodiments, when the computer-executable instructions stored on the storage medium are executed by the processor, the processing result obtained from the trusted execution environment is encrypted with a designated key; and the designated key is a key used by the data provider to encrypt the to-be-processed data.

In some embodiments, when the computer-executable instructions stored on the storage medium are executed by the processor, obtaining one or more model parameters of a target model for processing the to-be-processed data may include: detecting whether the data provider instructs to train the target model; and if so, then training the one or more model parameters of the target model; if not, then obtaining one or more model parameters of the target model stored on the data processing server.

In some embodiments, when the computer-executable instructions stored on the storage medium are executed by the processor, detecting whether the data provider instructs to train the target model may include: detecting whether the data provider uploads second ciphertext for training the target model; and if so, then determining that the data provider instructs to train the target model; if not, then determining that the data provider does not instruct to train the target model.

In some embodiments, when the computer-executable instructions stored on the storage medium are executed by the processor, training the one or more model parameters of the target model may include: detecting whether the data provider uploads one or more initialization parameter values corresponding to the target model; if so, then obtaining the one or more initialization parameter values; if not, then obtaining sample data from second ciphertext uploaded by the data provider and used for training the target model, and determining one or more initialization parameter values in the trusted execution environment based on the sample data; and training the one or more model parameters of the target model in the trusted execution environment based on the one or more initialization parameter values and the second ciphertext.

In some embodiments, when the computer-executable instructions stored on the storage medium are executed by the processor, if the data provider instructs to train the target model, the following operations may further be performed: encapsulating the second ciphertext into one or more ciphertext packets in the trusted execution environment, wherein multiple pieces of the second ciphertext are encapsulated in each ciphertext packet.

In some embodiments, when the computer-executable instructions stored on the storage medium are executed by the processor, obtaining sample data from second ciphertext uploaded by the data provider and used for training the target model may include: determining, via a master node, the quantity of pieces of the sample data to be obtained from each ciphertext packet; obtaining a corresponding quantity of pieces of the second ciphertext from each ciphertext packet in the trusted execution environment via multiple data obtaining nodes; collecting, via the master node, the second ciphertext obtained by each data obtaining node, inputting the obtained second ciphertext into the trusted execution environment, and encapsulating the ciphertext into one or more ciphertext packets in the trusted execution environment as the sample data.

In some embodiments, when the computer-executable instructions stored on the storage medium are executed by the processor, inputting the first ciphertext and the one or more model parameters into the trusted execution environment may include: inputting the first ciphertext and the one or more model parameters in a serialized format into the trusted execution environment by calling a JNI function.

According to the embodiments, when the computer-executable instructions stored on the storage medium are executed by a processor, if a data provider processes data via a data processing server, the data provider encrypts the to-be-processed data before uploading to the data processing server. In this way, the transmission between the data provider and the data processing server complies with the data transmission regulations. In addition, after the data processing server obtains ciphertext of the to-be-processed data uploaded by the data provider, the ciphertext is processed and analyzed in a trusted execution environment on the data processing server; and the trusted execution environment outputs a data processing result. Therefore, plaintext of to-be-processed data provided by the data provider can be obtained from nowhere but the trusted execution environment, thereby guaranteeing data security of the data provider.

In the 1990s, an improvement in technology can be clearly identified as a hardware improvement (for example, an improvement in a diode, a transistor, a switch, and other circuit structures), or a software improvement (for example, an improvement in a method flow). However, with the development of various technologies, an improvement to many method flows nowadays can also be deemed as a direct improvement to a hardware circuit structure. Most of the design engineers obtain a corresponding hardware circuit structure by programming an improved method flow in a hardware circuit. Therefore, one cannot make the statement that an improvement in a method flow cannot be implemented in a physical hardware module. For example, a programmable logic device (PLD) (for example, a field programmable gate array, FPGA) is such an integrated circuit that the logic functions thereof are determined by programming the device. Design engineers can program and "integrate" a digital system in a PLD without having a manufacturer to design and manufacture a dedicated integrated circuit chip. Moreover, at present, instead of manually manufacturing an integrated circuit chip, the programming in most cases is achieved by using "logic compiler" software. The logic compiler is similar to a software compiler used for developing and compiling a program; and before compilation, the raw codes may also need to be complied in a specific programming language, which is called hardware description language (HDL); furthermore, there are many types rather than only one type of HDL, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), and the like. The most commonly used HDL at present is Very-High-Speed Integrated Circuit Hardware Description Language (VHDL) and Verilog. Those skilled in the art should appreciate that by simply performing logic programming on a method flow by using several of the above-described hardware description languages and programming the method flow in an integrated circuit, a hardware circuit for implementing the logic method flow can be obtained easily.

A controller can be implemented in any appropriate form; for example, the controller can be in the forms of a microprocessor or a processor, a computer-readable medium having stored therein a computer-readable program code (for example, software or hardware) which can be executed by the microprocessor/processor, a logic gate, a switch, an application specific integrated circuit (ASIC), a programmable logic controller, and an embedded micro-controller; the examples of controllers include, but are not limited to, the following micro-controllers: ARC 625D, Atmel AT91SAM, Microchip PIC18F26K20, and Silicone Labs C8051F320. A memory controller can also be implemented as a part of a memory control logic. Those skilled in the art should appreciate that besides the controller being implemented by using only computer-readable program codes, it is completely acceptable to perform logic programming on method steps to enable the controller to realize the same functions in the forms of a logic gate, a switch, a dedicated integrated circuit, a programmable logic controller, and an embedded micro-controller. Therefore, the controller can be considered as a hardware component; and the devices for realizing various functions included in the controller can also be considered as structures of the hardware component. Alternatively, the devices for realizing various functions can be even considered as a software module for implementing a method, and also a structure of the hardware component.

Systems, apparatuses, modules, or units described in the above-described embodiments may be implemented by computer chips or entities, or by products with a certain function. A typical implementation device is a computer. For example, the computer, can be a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the above apparatuses are described on the basis of respective functions of each unit thereof. Naturally, when the embodiments are implemented, the functions of the units can be implemented in the same one or a plurality of software and/or hardware.

Those skilled in the art should appreciate that the embodiments of the specification can be embodied as a method, a system or a computer program product. Therefore, the application can take the form of an entirely hardware embodiment, an entirely software embodiment or an embodiment combining hardware and software elements. Furthermore, the application can take the form of a computer program product embodied in one or a plurality of computer usable storage media including computer usable program codes therein (including, but not limited to, a magnetic disk storage, a CD-ROM, an optical memory, and the like).

The application is described with reference to the flow charts and/or block diagrams of the method, device (system), and computer program product according to the embodiments of the specification. It should be understood that each flow and/or block in the flow charts and/or the block diagrams, and a combination of the flows and/or the blocks in the flow charts and/or the block diagrams can be implemented via computer program instructions. The computer program instructions may also be loaded onto a general-purpose computer, a specialized computer, an embedded processor, or the processors of other programmable data processing devices to produce a computer such that the instructions which are executed on the computer or other processors of the programmable devices generate an apparatus for implementing the functions specified in one or more flows in a flow chart and/or one or more blocks in a block diagram.

The computer program instructions can also be stored in a computer readable memory which can boot a computer or other programmable data processing devices to operate in a specific manner, such that the instructions stored in the computer readable memory generate a product comprising an instruction apparatus, wherein the instruction apparatus is configured to realize the functions specified in one or more flows in a flow chart and/or one or more blocks in a block diagram.

The computer program instructions can also be loaded to a computer or other programmable data processing devices, so as to execute a series of operation steps on the computer or the other programmable devices to generate a computer reliable process, such that the instructions executed on the computer or the other programmable devices can provide steps for implementing the functions specified in one or more flows in a flow chart and/or one or more blocks in a block diagram.

In a typical configuration, a computing device comprises one or more processors (CPU), an input/output interface, a network interface, and an internal memory.

The internal memory may comprise a volatile memory on a computer readable medium, a random access memory (RAM), and/or a non-volatile memory, such as a read-only memory (ROM), or a flash memory (flash RAM). The internal memory is an example of the computer readable medium.

The computer readable medium includes non-volatile, volatile, removable and non-removable media which can store information by any methods or technologies. The information can be a computer readable instruction, a data structure, a program module, or other data. The examples of the computer storage medium include, but are not limited to, a phase-change random access memory (PRAM), a static random access memory (SRAM), a dynamic random access memory (DRAM), other types of random access memories (RAM), a read-only memory (ROM), an electrically-erasable programmable read-only memory (EEPROM), a flash memory or other memory technologies, a read-only compact disk read-only memory (CD-ROM), a digital video disk (DVD) or other optical memories, a cassette type magnetic tape, a magnetic tape, a magnetic disk memory or other magnetic storage devices, or any other non-transmission medium. The computer storage medium can be configured to store information which can be accessed by the computing device. According to the description of the specification, the computer readable medium does not include a transitory media, such as a modulated data signal or a carrier.

It should be further noted that the terms "comprise," "include," or any other variant thereof is intended to be non-exclusive, and therefore a process, method, commodity or device comprising a series of elements include not only the elements, but also other elements are not listed explicitly or the elements inherent in the process, method, commodity, or device. Unless more limitations are stated, the element defined by the sentence "comprising a . . . " does not exclude the situation that the process, method, commodity or device comprising the element further comprises another same element.

Those skilled in the art should appreciate that the embodiments of the specification can be embodied as a method, a system, or a computer program product. Therefore, the application can take the form of an entirely hardware embodiment, an entirely software embodiment or an embodiment combining hardware and software elements. Furthermore, the application can take the form of a computer program product which can be executed by one or more computer usable storage mediums including computer usable program codes therein (including, but not limited to, a magnetic disk storage, a CD-ROM, an optical memory, and the like).

The specification can be described in a general context of a computer executable instruction executed by a computer, for example, a program module. Generally, the program module comprises a routine, a program, an object, an assembly, a data structure for executing a specific task or for implementing a specific abstract type of data. The embodiments of the specification can also be implemented in a distributed computation environment; and in the distributed computation environment, a task is executed by a remote processing device connected via a communication network. In the distributed computation environment, the program module can be located in a local and a remote computer storage mediums comprising a storage medium.

The embodiments of the specification are described in a progressive manner; the same or similar parts in the embodiments can refer to each other; and each embodiment emphasizes differences from other embodiments. Particularly, the system embodiments are basically similar to the method embodiments, and are thus described in a more concise manner. The relevant portions can refer to the descriptions in the method embodiments.

The descriptions above are some embodiments of the specification, but not intended to limit the application. For those skilled in the art, the application may have various modifications and variations. Any modifications, equivalent substitutions, improvements, and the like within the spirit and principles of the application shall fall within the scope of the claims of the application.

The invention claimed is:

1. A data processing method, implementable by a data processing server comprising a trusted execution environment, the method comprising:
obtaining data from an external system, wherein the data includes a first ciphertext of target data;
determining whether the data includes a second ciphertext for training a model for processing the target data;
in response to determining that the data includes the second ciphertext for training the model for processing the target data, determining whether the external system provides initialization parameter values for training the model;
in response to determining that the external system provides the initialization parameter values for training the model, training the model in the trusted execution environment with the initialization parameter values and the second ciphertext to obtain one or more parameters of the model for processing the first ciphertext;
obtaining, via a data transmission channel between the trusted execution environment and the external system, an encryption key associated with the first ciphertext;
inputting the first ciphertext and the one or more parameters of the model to the trusted execution environment;
decrypting, in the trusted execution environment, the first ciphertext using the encryption key to obtain the target data;
processing, in the trusted execution environment, the obtained target data using the model with the one or more parameters to obtain a result;
encrypting, in the trusted execution environment, the result using the encryption key; and
sending the encrypted result to the external system.

2. The method of claim 1, further comprising:
in response to determining that the data does not include the second ciphertext for training the model for processing the target data, obtaining parameters of the model stored on the data processing server, for processing the first ciphertext.

3. The method of claim 1, further comprising:
in response to determining that the external system does not provide the initialization parameter values for training the model, obtaining sample data from the second ciphertext, and determining the initialization parameter values based on the sample data in the trusted execution environment.

4. The method of claim 1, wherein the one or more parameters of the model for processing the first ciphertext comprise at least one of a mean, vector, or covariance matrix of the model.

5. The method of claim 1, wherein training the model in the trusted execution environment with the initialization parameter values and the second ciphertext to obtain one or more parameters of the model for processing the first ciphertext comprises:
training the model in the trusted execution environment via an iterative process.

6. The method of claim 1, wherein training the model in the trusted execution environment with the initialization parameter values and the second ciphertext to obtain one or more parameters of the model for processing the first ciphertext comprises:
decrypting, in the trusted execution environment, the second ciphertext to obtain sample data for training the model; and
determining, in the trusted execution environment, the one or more parameters by training the model based on the sample data.

7. The method of claim 1, further comprising:
obtaining from the external system the initialization parameter values for the one or more parameters of the model.

8. The method of claim 1, wherein inputting the first ciphertext and the one or more parameters of the model to the trusted execution environment comprises:
inputting the first ciphertext and the one or more parameters of the model in a serialized form to the trusted execution environment by calling a Java Native Interface (JNI) function.

9. A system for processing data, the system comprising:
one or more processors including a trusted execution environment and one or more non-transitory computer-readable memories coupled to the one or more processors and configured with instructions executable by the one or more processors to cause the system to perform operations:
obtaining data from an external system, wherein the data includes a first ciphertext of target data;
determining whether the data includes a second ciphertext for training a model for processing the target data;
in response to determining that the data includes the second ciphertext for training the model for processing the target data, determining whether the external system provides initialization parameter values for training the model;
in response to determining that the external system provides the initialization parameter values for training the model, training the model in the trusted execution environment with the initialization parameter values and the second ciphertext to obtain one or more parameters of the model for processing the first ciphertext;
obtaining, via a data transmission channel between the trusted execution environment and the external system, an encryption key associated with the ciphertext of the target data;
inputting the ciphertext of the target data and the one or more parameters of the model to the trusted execution environment;
decrypting, in the trusted execution environment, the ciphertext of the target data using the encryption key to obtain the target data;
processing, in the trusted execution environment, the obtained target data using the model with the one or more parameters to obtain a result;
encrypting, in the trusted execution environment, the result using the encryption key; and
sending the encrypted result to the external system.

10. The system of claim 9, wherein the operations further comprise:
in response to determining that the data does not include the second ciphertext for training the model for processing the target data, obtaining parameters of the model stored on the data processing server, for processing the first ciphertext.

11. The system of claim 9, wherein the operations further comprise:
in response to determining that the external system does not provide the initialization parameter values for training the model, obtaining sample data from the second ciphertext, and determining the initialization parameter values based on the sample data in the trusted execution environment.

12. The system of claim 9, wherein the one or more parameters of the model for processing the first ciphertext comprise at least one of a mean, vector, or covariance matrix of the model.

13. The system of claim 9, wherein training the model in the trusted execution environment with the initialization parameter values and the second ciphertext to obtain one or more parameters of the model for processing the first ciphertext comprises:
training the model in the trusted execution environment via an iterative process.

14. The system of claim 9, wherein training the model in the trusted execution environment with the initialization parameter values and the second ciphertext to obtain one or more parameters of the model for processing the first ciphertext comprises:
decrypting, in the trusted execution environment, the second ciphertext to obtain sample data for training the model; and
determining, in the trusted execution environment, the one or more parameters by training the model based on the sample data.

15. The system of claim 9, wherein the operations further comprise:
obtaining from the external system the initialization parameter values for the one or more parameters of the model.

16. The system of claim 9, wherein inputting the ciphertext of the target data and the one or more parameters of the model to the trusted execution environment comprises:
inputting the ciphertext of the target data and the one or more parameters of the model in a serialized form to the trusted execution environment by calling a Java Native Interface (JNI) function.

17. A non-transitory computer-readable storage medium configured with instructions executable by one or more processors comprising a trusted execution environment, to cause the one or more processors to perform operations comprising:
obtaining data from an external system, wherein the data includes a first ciphertext of target data;
determining whether the data includes a second ciphertext for training a model for processing the target data;
in response to determining that the data includes the second ciphertext for training the model for processing the target data, determining whether the external system provides initialization parameter values for training the model;
in response to determining that the external system provides the initialization parameter values for training the model, training the model in the trusted execution environment with the initialization parameter values and the second ciphertext to obtain one or more parameters of the model for processing the first ciphertext;
obtaining, via a data transmission channel between the trusted execution environment and the external system, an encryption key associated with the ciphertext of the target data;

inputting the ciphertext of the target data and the one or more parameters of the model to the trusted execution environment;

decrypting, in the trusted execution environment, the ciphertext of the target data using the encryption key to obtain the target data;

processing, in the trusted execution environment, the obtained target data using the model with the one or more parameters to obtain a result;

encrypting, in the trusted execution environment, the result using the encryption key; and sending the encrypted result to the external system.

18. The non-transitory computer-readable storage medium of claim 17, wherein the operations further comprise:

in response to determining that the data does not include the second ciphertext for training the model for processing the target data, obtaining parameters of the model stored on the data processing server, for processing the first ciphertext.

19. The non-transitory computer-readable storage medium of claim 17, wherein the operations further comprise:

in response to determining that the external system does not provide the initialization parameter values for training the model, obtaining sample data from the second ciphertext, and determining the initialization parameter values based on the sample data in the trusted execution environment.

20. The non-transitory computer-readable storage medium of claim 17, wherein the one or more parameters of the model for processing the first ciphertext comprise at least one of a mean, vector, or covariance matrix of the model.

* * * * *